Jun 2, 1931.    J. G. POORMAN    1,808,433
FEED STRUCTURE
Filed Dec. 2, 1929    2 Sheets-Sheet 1
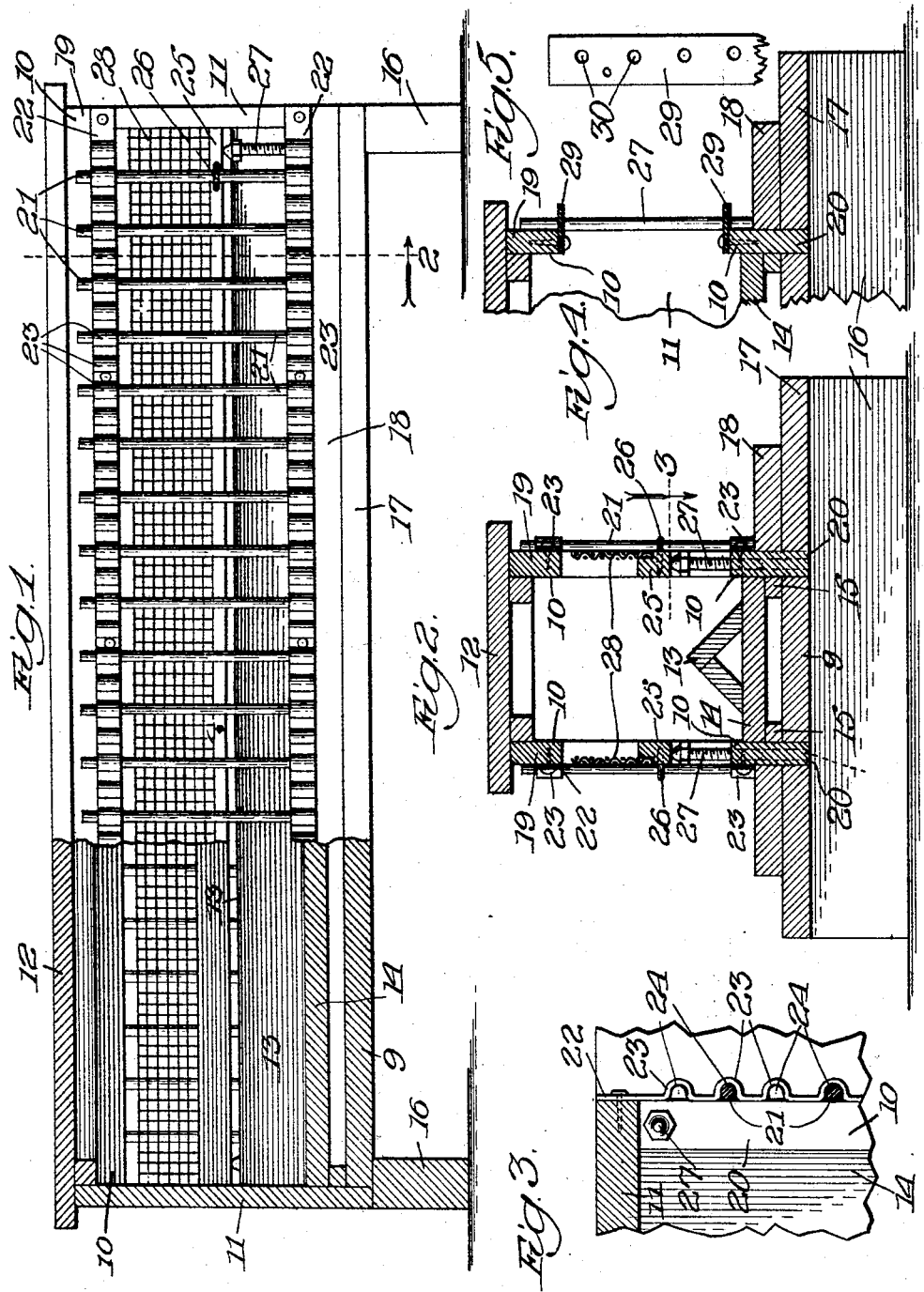
Inventor,
John G. Poorman,
By Dyrenforth, Lee, Chritton & Wiles
Attys

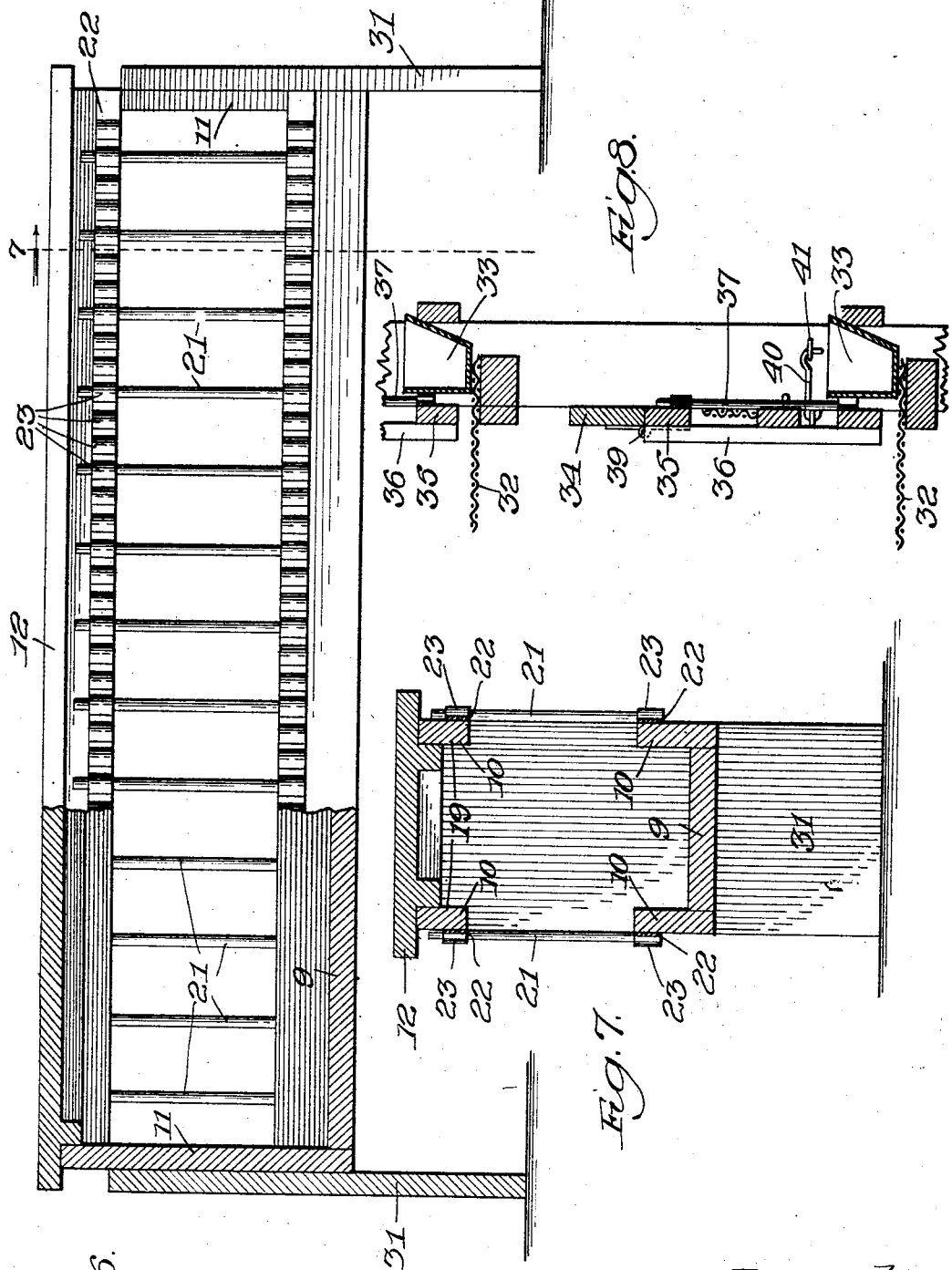

Patented June 2, 1931

1,808,433

UNITED STATES PATENT OFFICE

JOHN G. POORMAN, OF TINLEY PARK, ILLINOIS

FEED STRUCTURE

Application filed December 2, 1929. Serial No. 411,127.

My invention relates to feed structures more particularly, though not exclusively, for chickens.

One of my objects is to provide a feed structure of such construction that adequate provision is made for preventing the chickens from entering the receptacle for the feed while permitting the chickens to feed therefrom, and which, simply by adjusting certain of the elements of the barrier means separating the chickens from the feed receptacle, may be rendered suitable for use throughout the period of growth of the chickens, as distinguished from requiring the use of different structures during different periods of growth of the chickens.

Another object is to provide such a structure which will afford the desired ventilation; and other objects as will be manifest from the following description.

Referring to the accompanying drawings:

Figure 1, is a view in side elevation, with certain parts broken away, of a feed device embodying my invention.

Figure 2 is a section taken at the line 2 on Fig. 1 and viewed in the direction of the arrow.

Figure 3 is an enlarged broken plan sectional view taken at the line 3 on Fig. 2 and viewed in the direction of the arrow.

Figure 4 is a broken view, similar to Fig. 2, of a modification of the structure therein shown.

Figure 5 is a broken plan view of one of the elements of the structure of Fig. 4.

Figure 6 is a view in side elevation of the structure of Fig. 1 showing it in its condition for use in the feeding of the chickens at a subsequent stage in their development.

Figure 7 is a section taken at the line 7 on Fig. 6 and viewed in the direction of the arrow; and Figure 8, a broken sectional view, in elevation, of a housing structure embodying my invention.

Referring first to the construction illustrated in Figs. 1, 2 and 3, in which the invention is shown as incorporated in a feed device structure, the structure comprises a feed receptacle and supporting means therefor, the feed receptacle comprising a bottom member 9, side walls 10 extending lengthwise of the structure, end walls 11, and a removable roof portion 12, the receptacle also containing a feed spreader represented at 13, the lower bottom portion 14 of which is supported by the bottom member 9 with cleats 15 interposed.

The supporting structure, or base, for the the feed receptacle is shown as comprising a pair of bars 16, which may be 2 x 4's, located at the ends of the feed receptacle and by which the latter is supported at its ends, there being provided at opposite sides of the feed receptacle a platform formed of superposed boards 17 and 18, respectively, connected with the bars 16 the boards 18 being narrower than the boards 17 and so disposed as to form steps as shown, and the boards 18 being separable from the boards 17.

The side wall portions 10 of the feed receptacle which are of general rectangular shape as shown are of framelike form, their upper and lower portions being represented at 19 and 20, respectively, these framelike sides each presenting a substantially rectangular-shaped opening extending substantially the entire length of the structure with the lower walls of these openings disposed above the tops of the boards 18.

The wall portions 10 are provided with upwardly extending laterally spaced rods represented at 21 which present openings through which the chickens may project their heads into the interior of the feed device for feeding, these rods being adjustably supported to permit of the varying of the size of the openings presented between these rods.

To permit of such adjustment of the rods the frame portions 19 and 20 are each provided with a metal strip 22 deflected outwardly at intervals, as represented at 23, to form sockets 24 to receive the ends of the rods 21, the sockets of these bars alining with each other vertically. The rods 21 are removable from, and replaceable in, these sockets, and may be caused to extend in any desired spaced condition by selectively introducing the rods 21 into the appropriate ones of the sockets.

The structure also comprises a bar 25 at each wall portion 10, these bars extending crosswise of the rods 21 and being slidable up and down thereon, as for example at straps 26 partially surrounding certain of the rods 21 and secured in the bars 25. The bars 25 may be held in any desired position of vertical adjustment as by means of the screw devices 27 screwing into the opposite ends of the lower frame portions 20 and forming supports for the bars 25 as shown.

The bars 25 are provided with relatively stiff wire mesh represented at 28 this mesh extending upwardly from these bars.

Figs. 4 and 5 show a modified construction of the means for holding the rods 21 in the desired spaced apart relation. In this construction, instead of providing the strips 22, horizontally extending strips represented at 29 are secured to the underside of the upper frame portion 19 and to the upper side of the lower frame portion 20, respectively, these strips containing openings 30 therein to receive the rods and in which the rods may be selectively positioned as explained of the construction shown in Fig. 1.

The structure is shown in Figs. 1 to 5, inclusive, as conditioned for the feeding of chickens beginning about one week old, the chickens standing on the board portion 18 of the base and feeding through the openings between the rods 21, which latter are adjusted sufficiently far apart to permit the heads only of the chickens to project into a position to feed from the receptacle. The bar structures 25, together with their screen portions 28 which, together with the frames of the side walls 10 and the rods 21, form barrier means, are then adjusted vertically to a position in which they will not interfere with the feeding of the chickens but will prevent the chickens from worming themselves through the openings in these barrier structures.

As the chickens grow older, the rods 21 and the bar portions 25 may be re-adjusted to permit the chickens to feed while preventing them from bodily entering the feed receptacle. When the chickens are about one month old the bar portions 25, with their mesh portions 28, may be removed; and the board portions 18 and the structure comprising the spreader 13, together with the bottom 14 and the cleats 15, removed when the chickens become sufficiently grown to permit the elimination of these parts.

After the chickens are about three months old, the feed receptacle structure comprising the bottom member 9, walls 10 and 11 and top 12 are separated as a unit from the remaining parts of the structure and legs of the desired height secured to the opposite ends of the feed receptacle to cause the latter to extend at the desired height for the feeding of the chickens at this stage of their development. In Figs. 6 and 7 the unitary feed receptacle is shown so positioned, the legs by which it is supported being represented at 31.

It will thus be understood from the foregoing that by constructing the feed device in accordance with my invention, the same may be used, simply with change of adjustments of the parts for the feeding of the chickens during all stages of their development, with the manifest advantage.

In Fig. 8 I have illustrated my invention as embodied in a housing structure for the chickens and with which is associated feed troughs located exterior of the housing structure.

The construction shown comprises a battery of housing compartments separated by horizontal screen partitions 32, in accordance with common practice, there being located beyond a side wall of these compartments feed troughs 33. The chickens feed from the inside of the compartments the side walls 34 of which present openings 35 extending the full length of the feed troughs 33, these openings being provided with frame structures 36 of the same construction as the side-wall-forming portions 10 of the feed receptacle of Figs. 1, 2 and 3, these side-wall portions thus being in the form of apertured barriers through which the chickens may project their heads into the feed troughs 33, the apertures in the barrier means being widened or decreased at will by adjusting the upwardly extending rods thereof represented at 37 and corresponding with the rods 21 of the construction of the preceding figures of the drawing, the vertical adjustable cross-bar portion of these barrier means, and corresponding with the cross-bar 25, with its mesh 28, being represented at 38.

The barrier-forming framelike structures 36, together with the parts carried thereby are preferably hinged at their upper edges to the stationary wall portion 34 as represented at 39 to permit of movement out of the way when desired, the same being shown as releasably held in barrier-forming position by means of hooks 40 on these barrier means and cooperating with eyes 41 on a stationary part of the structure.

The provision of the mesh on the bars 25 and 38 is of advantage as it serves to function as a barrier while permitting of the free circulation of air and passage of light, therethrough.

While I have illustrated and described certain particular constructions embodying my invention, I do not wish to be understood as intending to limit it thereto as the same may be variously modified and altered without departing from the spirit of my invention.

What I claim as new, and desire to secure by Letters Patent, is:

1. In combination with a feed receptacle, a barrier structure comprising elements arranged to present openings through which the heads of chickens may be projected into the feed receptacle, said elements being relatively adjustable individually to vary the size of said openings.

2. In combination with a feed receptacle, a barrier structure comprising a plurality of upwardly extending spaced apart rods relatively adjustable individually to vary the width of the spaces between said rods.

3. In combination with a feed receptacle, a barrier structure comprising a plurality of upwardly extending spaced apart rods relatively adjustable to vary the width of the spaces between said rods, and a member extending crosswise of said rods and adjustable in the direction of the length of said rods.

4. In combination with a feed receptacle, a barrier structure comprising a supporting structure and a plurality of upwardly extending spaced apart rods on said supporting structure and relatively adjustable individually to vary the width of the spaces between said rods.

5. In combination with a feed receptacle, a barrier structure comprising a supporting structure, a plurality of upwardly extending spaced apart rods on said supporting structure and relatively adjustable to vary the width of the spaces between said rods, and a member extending crosswise of said rods and adjustable in the direction of the length of said rods.

6. In combination with a feed receptacle, a barrier structure comprising a frame, a plurality of upwardly extending spaced apart rods in said frame and relatively adjustable to vary the width of the spaces between said rods and a member extending crosswise of said rods and adjustable in the direction of the length of said rods.

7. In combination with a feed receptacle, a barrier structure comprising a plurality of upwardly extending spaced apart rods relatively adjustable to vary the width of the spaces between said rods, and a member extending crosswise of said rods and adjustable in the direction of the length of said rods and having a reticulated portion, for the purpose set forth.

8. A feed hopper comprising a base and an apertured barrier structure positioned to prevent chickens from entering the hopper but permitting them to reach the feed therein, said base being formed of superposed members the upper one of which is removable to increase the distance from the upper surface of said base to the apertures in said barrier structure.

9. A feed hopper comprising a base and an apertured barrier structure positioned to prevent chickens from entering the hopper but permitting them to reach the feed therein, said base being formed of superposed members arranged to form steps, the upper one of said members being removable to increase the distance from the upper surface of said base to the apertures in said barrier structure.

10. A feed-hopper device comprising a unitary structure including a feed-hopper with side walls one of which is in the form of an apertured barrier, and a base for supporting said unitary structure in elevated position, said unitary structure and base being separable to permit said unitary structure to be applied to other supporting means for supporting said unitary structure at a higher elevation.

11. A feed-hopper device comprising a unitary structure including a feed-hopper with side walls one of which is in the form of an apertured barrier, and a base for supporting said unitary structure in elevated position, said unitary structure and base being separable to permit said unitary structure to be applied to other supporting means for supporting said unitary structure at a higher elevation, said base being formed of superposed members the upper one of which is removable to increase the distance from the upper surface of said base to the apertures in said barrier structure.

12. A feed-hopper device comprising a unitary structure including a feed-hopper with side walls one of which is in the form of an apertured barrier, and a base for supporting said unitary structure in elevated position, said unitary structure and base being separable to permit said unitary structure to be applied to other supporting means for supporting said unitary structure at a higher elevation, said base being formed of superposed members arranged to form steps, the upper one of which is removable to increase the distance from the upper surface of said base to the apertures in said barrier structure.

13. A feed-hopper comprising a bottom member having a feed-spreading portion, and side walls certain of which comprise elements arranged to present openings through which the heads of chickens may be projected into the hopper, said elements being relatively adjustable in a horizontal direction to vary the side of said openings.

14. In combination with a feed receptacle, a barrier structure comprising a portion containing a substantially horizontally disposed series of rod-receiving openings and rods positioned in spaced apart relation in said openings and forming openings through which the heads of chickens may be projected into the feed receptacle, said rods being adapted to be selectively positioned in said rod-receiving openings for varying the width of the openings between said rods.

JOHN G. POORMAN.